United States Patent Office

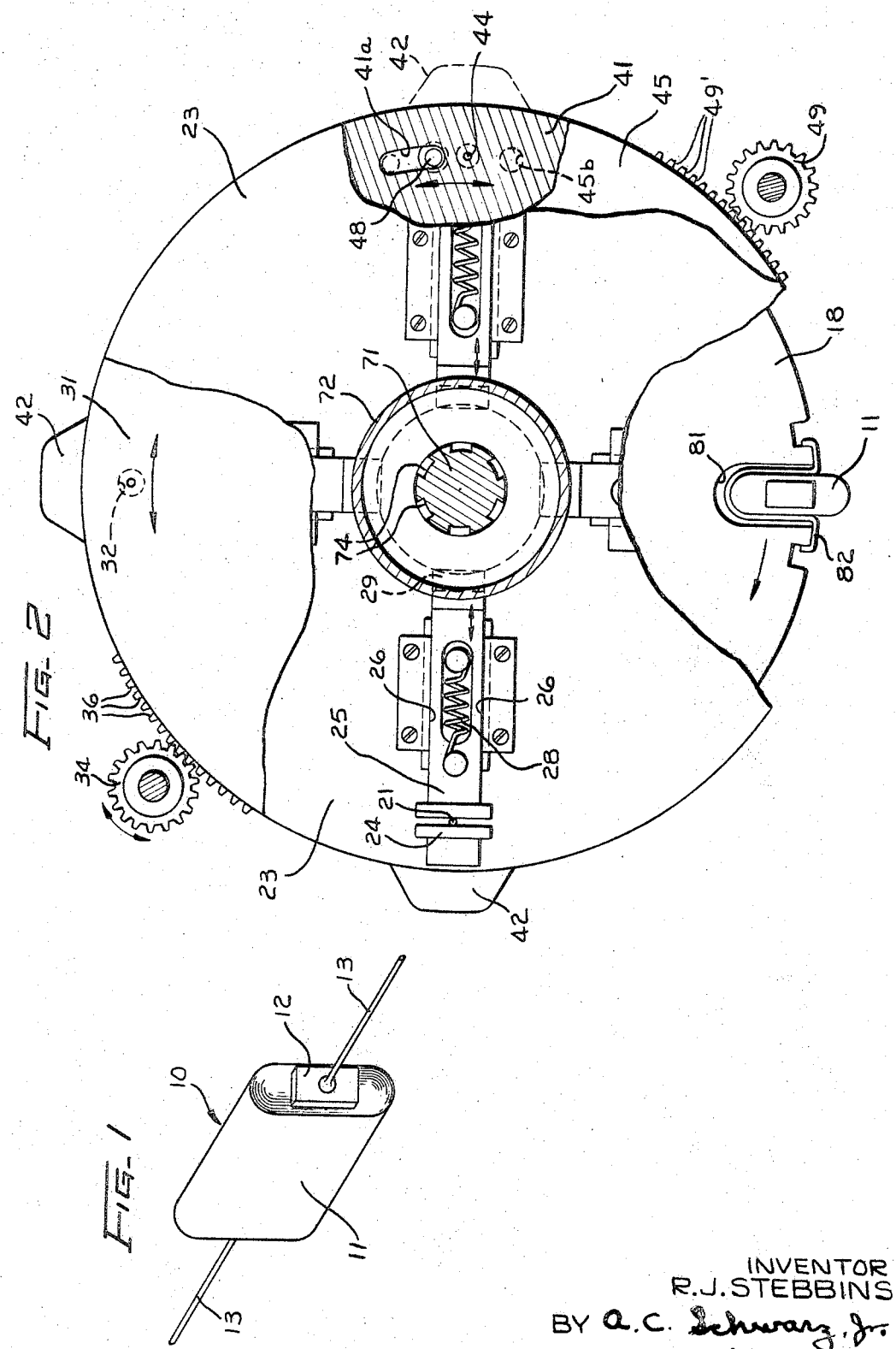

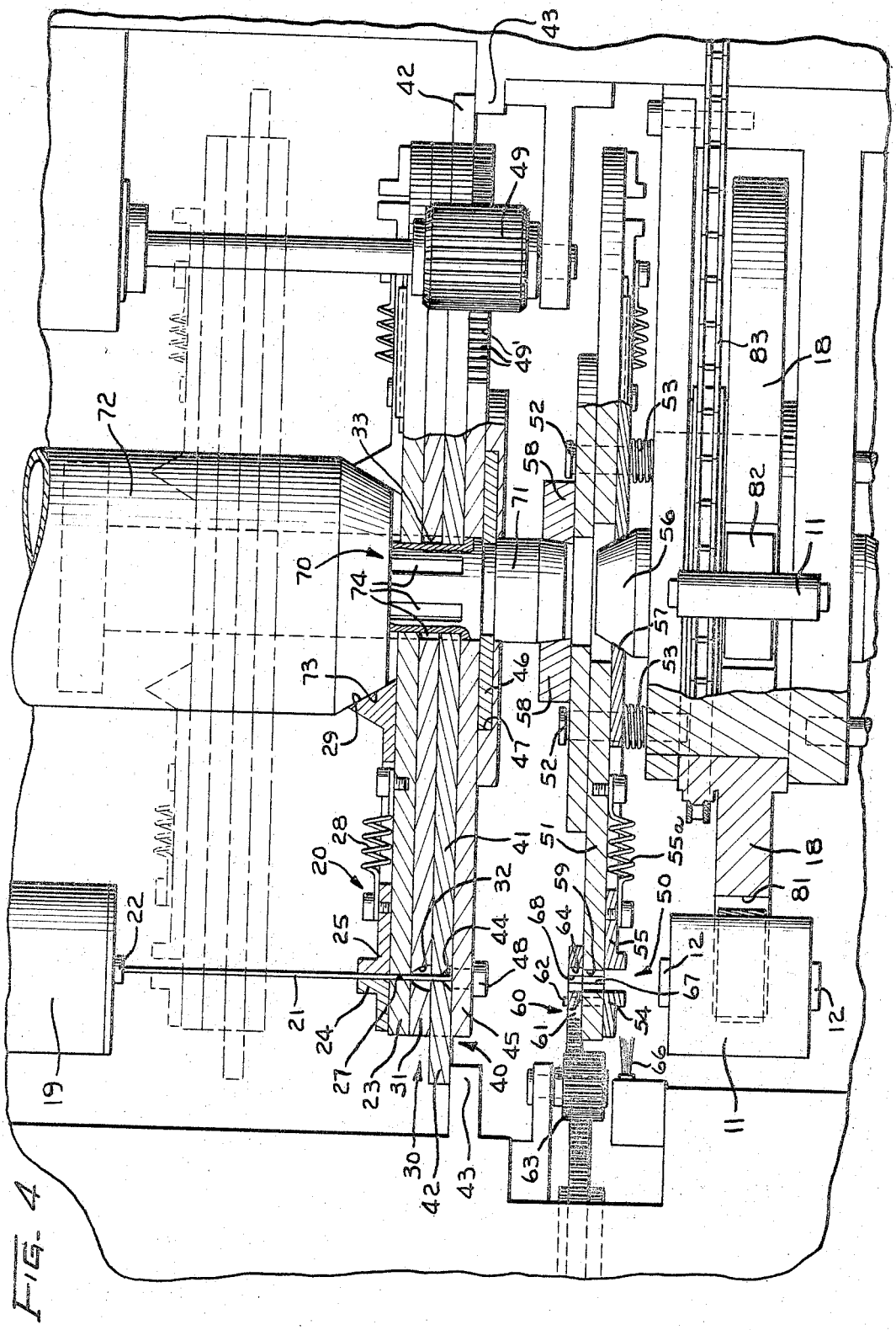

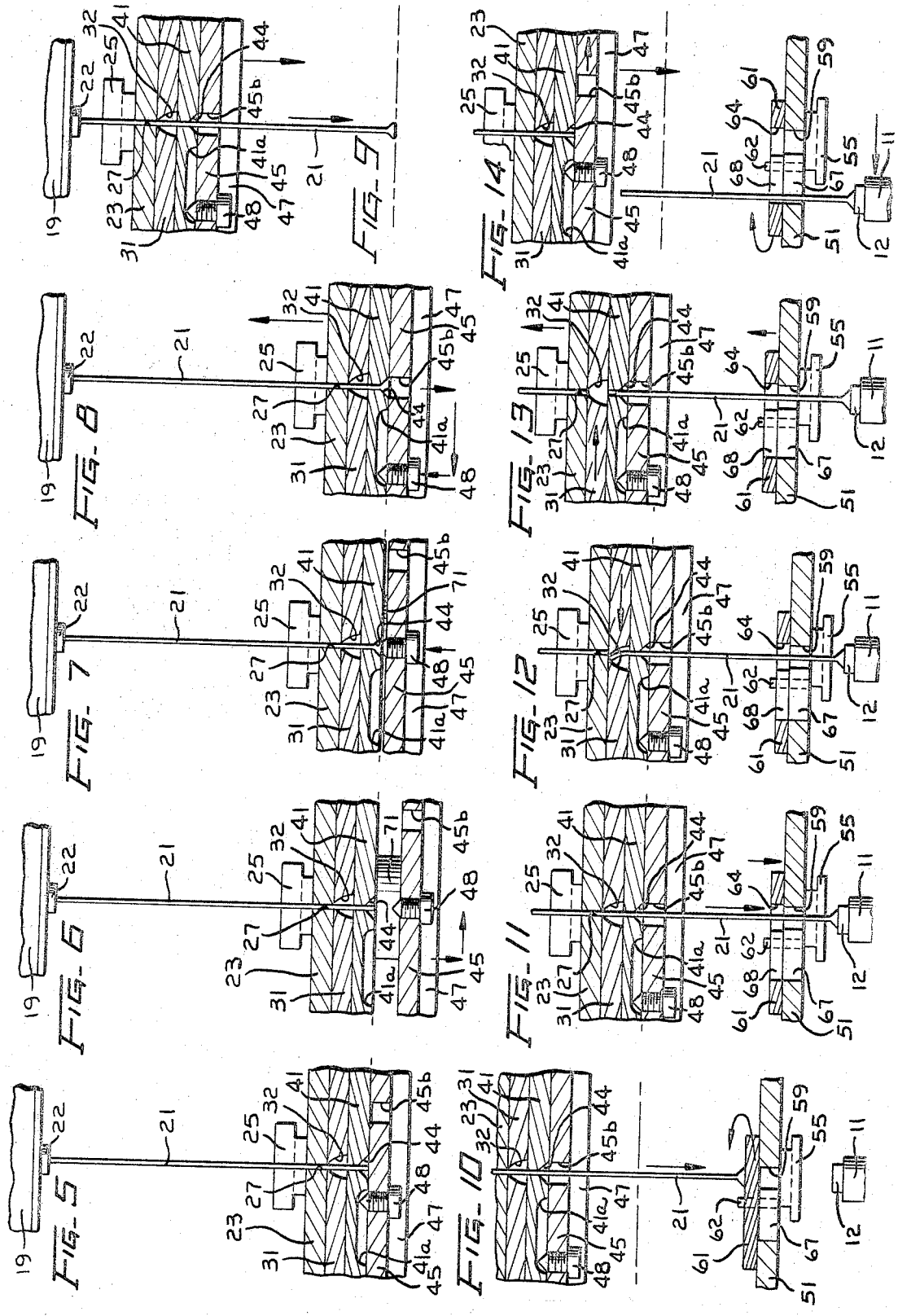

3,337,710
Patented Aug. 22, 1967

3,337,710
APPARATUS FOR FORMING AND ATTACH-
ING AN ELONGATED ELEMENT TO AN
ARTICLE
Reginald J. Stebbins, Chicago, Ill., assignor to Western
Electric Company, Incorporated, New York, N.Y., a
corporation of New York
Filed May 11, 1964, Ser. No. 366,405
21 Claims. (Cl. 219—85)

The present invention relates generally to apparatus for forming and attaching an elongated element to an article, and more particularly to apparatus for feeding the elongated element, shaping the elongated element, shearing the elongated element, and attaching the elongated element to the article.

In the fabrication of certain products, it is necessary to form and attach an elongated element to an article. This may include several operations—for example: feeding the element in a predetermined manner, shaping it to a desired configuration, cutting it to a prescribed length and attaching it to the article. Such operations are often quite difficult in nature and involve complex manipulations; consequently in the past, they frequently had to be performed manually with the aid of hand tools. In those instances where a machine could be used, each operation generally had to be performed independently—either at a remote work area as a separate stage of fabrication, or at one of several successive work stations, a separate operation being performed at each station in proper sequence.

General objects of the invention, therefore, are to provide new and improved apparatus for forming and attaching an elongated element to an article, wherein all component operations may be performed at a single work station as a single-stage fabrication, wherein the separate operations are mechanically integrated automatically, and wherein the continuous operating cycle greatly minimizes the time required for the entire fabrication.

Apparatus accomplishing the above objects in accordance with a feature of the invention, may include mechanism movable between a supply of filament and a device supporting an article to advance the filament into abutment against the article, a forming assemblage carried by the advancing mechanism for shaping the terminus end or extremity of the filament in preparation for attachment to the article during such advancement and an attaching unit attaching the element to the article upon abutment thereagainst, the forming assemblage thereafter cutting the filament to length. More specifically, such forming assemblage may include several component mechanisms for gripping, shaping, and shearing the filament—all carried by a drive unit for feeding the filament to the article.

More specific objects of the invention are to provide new and improved apparatus for intermittently feeding an elongated element, wherein the element may be fed through various distances with a variety of strokes so that a sequence of forming and attaching operations may be performed thereon, and wherein the feeding apparatus is provided with a simple and efficient construction which permits the cooperation of several mechanisms in an integrated sequence without interference with each other.

Apparatus accomplishing the preceding objects in accordance with a second feature of the invention, includes a pair of gripping jaws carried by a feed member for movement with a compound reciprocable driver designed to actuate and release the gripping jaws upon relative movement between first and second parts thereof. The jaws grip the element upon relative movement between the first and second parts of the driver, advance the element with the feed member upon collective movement thereof, and release the element again upon subsequent relative movement between the parts—retraction of the driver thereafter returning the feed member to its initial position.

Additional objects of the invention are to provide new and improved mechanism for shaping the terminus end of a filament in preparation for attachment to an article, and more particularly to mechanism for swaging or flaring the terminus end of a filament. Swaging apparatus in accordance with another feature of the invention may include a first member defining a swaging cavity open at both ends, a second member adjacent the first having a swaging punch which is normally nonaligned with the cavity so that a surface of the second member forms a stop for the terminus end of a wire received within the cavity, and a device for holding the filament in fixed relationship to the first member.

Suitable mechanism moves the two members relatively apart to withdraw the punch from an accommodating slot in the first member, moves one member laterally of the other to align the punch and cavity, moves the two members relatively together and apart again to swage the terminus end of the filament in the cavity with the punch, moves one of the members laterally of the other and then moves the members relatively together again to align a bore in the second member with the cavity to permit extraction of the swaged end of the filament therethrough from the cavity.

Further objects of the invention are to provide new and improved shearing mechanism for cutting an elongated element into prescribed lengths, and more particularly to provide shearing mechanism cooperable with the above intermittent feeding apparatus. As another feature of the invention, mechanism accomplishing these objects may include a shearing appendage engageable by the first part of the driver for movement with the feed member, and actuatable at any time during the feeding operation to shear the element—actuating mechanism being provided to shear the element in cooperation with the feeding apparatus when the prescribed length has been fed beyond the shearing device.

Still further objects of the invention are to provide new and improved mechanisms for clamping an elongated element against an article, and more particularly to provide clamping mechanism cooperable with the above intermittent feeding apparatus and/or shearing apparatus, for clamping and attaching the elongated element to an article. The preceding objects may be accomplished in accordance with still another feature of the invention by apparatus cooperable with the intermittent feeding apparatus and/or shearing apparatus and including a device for supporting an article along the path of advancement of the element, and a second gripping mechanism arranged along such path in close proximity to the article for gripping the element as it nears the article and advancing it into abutment against the article—an attaching unit attaching the element to the article upon such abutment.

A specific application wherein such apparatus may be utilized with great advantage is the forming and attaching of leads to electrical components. In such an application the operations to be sequentially performed are, for example: feeding the lead wire toward the component, flaring its terminus end, clamping the flared end against the component, attaching it to the component, and shearing the attached lead to length. As pointed out above, it would be highly desirable if all such operations could be performed by a single automatic machine as a single-stage fabrication.

Additional objects of the invention therefore include the provision of new and improved apparatus wherein feeding, forming, attaching and shearing mechanisms are advantageously integrated in a single machine for cyclically forming and attaching leads to electrical components, and wherein such mechanisms cooperate efficiently and effectively not only in the performance by each of its singular function, but also in assisting other mechanisms in the performance of their functions.

Apparatus accomplishing the above and other objects in accordance with a preferred embodiment of the invention, may include a feed member which is engaged with a first part of a reciprocable driver for reciprocating movement between a first holding device containing a continuous supply of wire and a second holding device supporting an electrical component. A first gripping mechanism, carried by the feed member, is actuated to grip the wire as a result of relative movement between first and second parts of the driver, and collective movement of the parts in an advancing stroke of the driver thereafter feeds the gripped wire toward the component.

In cooperation with such feeding apparatus, swaging mechanism may swage or flare the terminus end or extremity of the wire prior to clamping and attachment thereof to a solder end-cap on the electrical component. Clamping mechanism may include a carrier member resiliently mounted on the component-supporting device and engageable by the first part of the reciprocable driver to actuate a pair of electrode jaws, first to grip the wire as it nears the article and then to advance the flared end of the wire into firm abutment against the solder end-cap of the component.

Attaching mechanism may further be provided for heating the swaged end of the wire while it is clamped firmly against the solder end-cap of the component. In this manner, the solder end-cap and the terminus end may be fused together, thereby to attach a lead to the component.

With the lead thus attached, a shearing mechanism carried by the feed member may be actuated to cut the lead to length. The return stroke of the reciprocable driver is thereafter initiated by relative movement between the first and second parts to release the first gripping means and free the wire, and subsequent collective movement of the first and second parts in the return stroke releases the electrode jaws to free the attached lead. Continued retraction of the driver returns the feed member to its initial position and permits return of the carrier member to its initial position.

Other objects, advantages and aspects of the invention will appear from the following detailed description of a specific embodiment thereof when taken in conjunction with the appended drawings in which:

FIG. 1 is a perspective view depicting a finished capacitor with leads formed, attached, and cut to length;

FIG. 2 is a side elevational view of the preferred lead-attaching apparatus—portions of the apparatus being removed to reveal the details of certain ones of the cooperating mechanisms;

Figure 3:
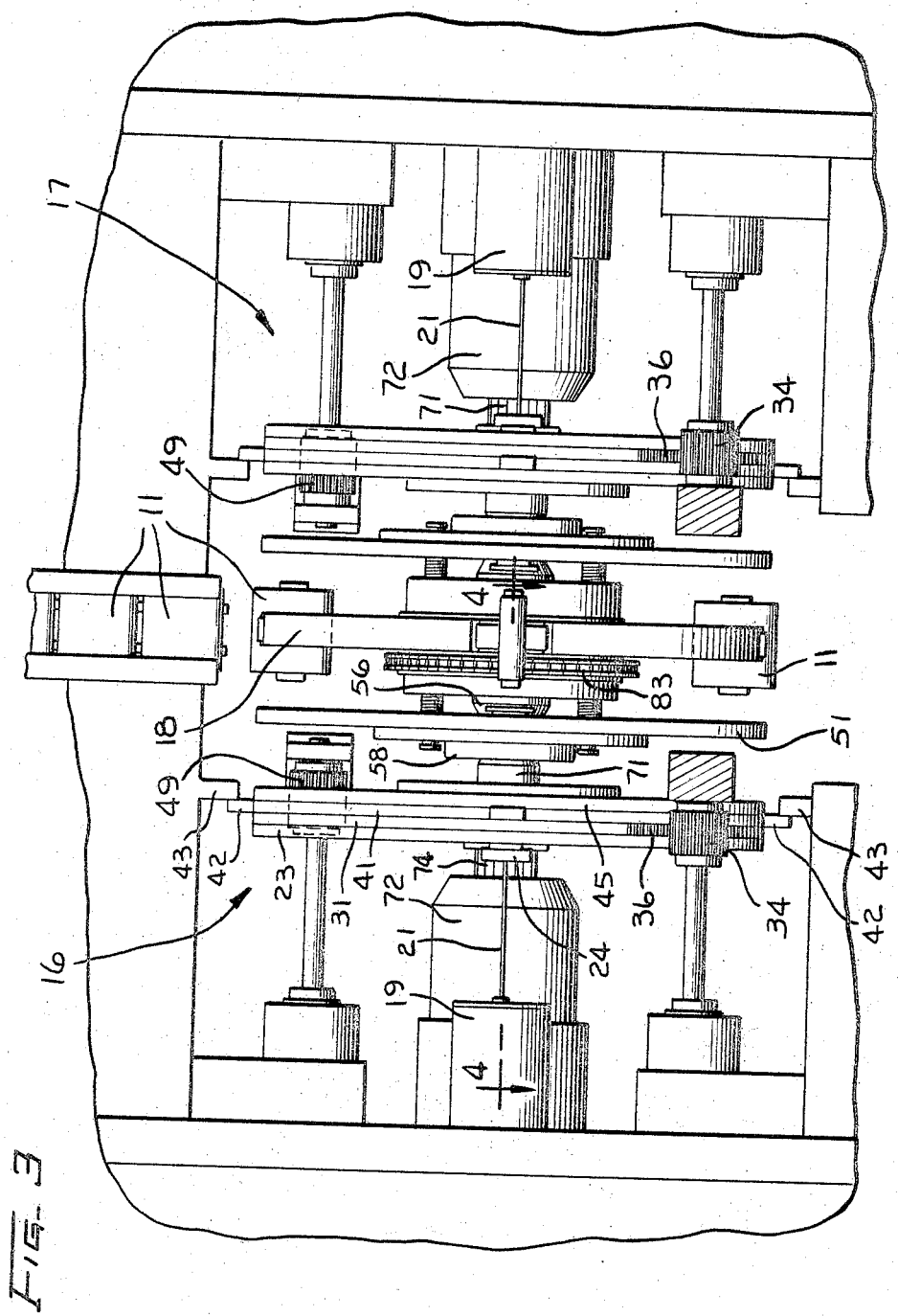
FIG. 3 is a somewhat reduced plan view of the preferred apparatus depicted in FIG. 2.

FIG. 4 is an enlarged, sectional view of the apparatus taken generally along the line 4—4 in FIG. 3 to reveal the specific details of the cooperating mechanisms; and FIGS. 5 through 14 are fragmentary sectional views taken generally parallel to the axis through the work area (looking radially inward)—such views depicting, in order, the preferred sequence of operations and the preferred cooperating mechanism for forming and attaching leads to capacitor bodies.

Referring now to the drawings and more particularly to FIG. 1, a finished capacitor, of the type indicated generally by the numeral 10, is shown as composed of an elongated body portion 11 having a solder cap 12 at either end, to which axially extending metallic leads 13—13 are attached. The leads 13—13 are formed and attached as follows: a pair of wires are advanced toward either end of a capacitor body 11—the terminus ends of the wires being swaged and treated with a flux prior to abutment against the solder end-caps 12—12—and electrical current is passed through the wires to fuse the swaged ends to the solder end-caps 12—12, after which the attached leads are cut to length.

To perform the above operations, the preferred apparatus, shown in FIG. 3, is composed of identical heads, indicated generally by the numerals 16 and 17, which are mounted on either side of a rotatable circular holding plate 18. The holding plate 18 supports capacitor bodies 11—11, with their axes in horizontal dispositions, at 90° intervals about the periphery thereof, and each head 16 and 17 is provided with a section devoted exclusively to each capacitor body 11 for forming and attaching a lead to one end thereof. Each head, and each section within the heads, operate in synchronism to form, attach, and cut to length, leads on both ends of all four capacitor bodies simultaneously.

With reference to FIG. 4, each head 16 and 17 includes a wire gripping and advancing assembly 20, a shearing mechanism 30, a swaging or flaring assembly 40, a clamping or electrode-gripping unit 50, a flux-applying unit 60, and a two element reciprocable drive unit 70—the latter unit actuating and/or positioning various of the operating units 20 through 60 in a predetermined sequence. Each section in the head is provided with a supply reel 19 positioned in axial alignment with the associated capacitor body 11, and wire 21 thereon is initially fed through a tensioning collar 22 and downward through aligned apertures in the units 20, 30, 40. Since each head, and each section within a head is identical, a single section within a head will be described in detail below—it being understood that such section is representative of all of the sections.

As depicted in FIGS. 2 and 4, the advancing and clamping assembly 20 includes a circular feed member or plate 23 which is coaxially received on an inner ram 71 of the two element drive unit 70, and is formed with a fixed gripping jaw 24 near the outer periphery thereof. A movable jaw 25 is slidably mounted in a dovetail guideway 26 (FIG. 2) for movement toward and away from the fixed jaw 24 to clamp and unclamp the wire 21, an aperture 27 in the plate 23 permitting the wire 21 to pass beyond the jaws 24 and 25.

The movable jaw 25 is normally biased to an open or unclamping position away from the fixed jaw 24 (FIGS. 2 and 4) by a spring 28, and is moved against the bias of the spring 28 toward the fixed jaw 24 into a clamping position by the drive unit 70. This is accomplished by an outer ram 72 of the drive unit 70, which is coaxially received about and splined to the inner ram 71 for relative sliding movement axially thereof only. The outer ram 72 is provided with a linear camming surface 73 (FIG. 4) which is slidably engaged with a follower surface 29 formed at the remote end of the movable jaw 25. Thus, when extended relative to the inner ram 71 to the position shown in FIG. 4, the outer ram 72 cams the movable jaw 25 toward the fixed jaw 24 to clamp the wire 21 therebetween.

If it were desired to use the wire advancing and clamping assembly 20 simply for intermittently feeding an elongated element, the inner ram 71 could be adapted for engagement with the feed plate 23 so that the latter moves axially therewith relative to the outer ram 72. With this arrangement, such intermittent feeding may be accomplished by initially extending the outer ram 72 with respect to the inner ram 71 so that the movable jaw 25 is cammed into clamping position to grip an element received in the aperture 27 against the fixed jaw 24. Collective movement of the inner and outer rams 71 and 72 in an advancing stroke may thereafter be utilized to feed the gripped element through a prescribed distance with the feed plate 23.

The outer ram 72 may then be retracted relative to the inner ram 71 to release the element, as the spring 28 returns the jaw 25 to an unclamping position, and the feed plate 23 subsequently returned to the initial position thereof by collective movement of the inner and outer rams 71 and 72 in a return stroke. Thus, upon continued reciprocal movement of the drive unit 70, an elongated element may be intermittently gripped and advanced by the intermittent feed apparatus.

The shearing mechanism 30 consists of a circular shear plate 31 which is coaxially mounted about the inner ram 71 in slidably-contacting relationship adjacent the feed plate 23, which plate 31 is integrally cooperable with the feed plate 23 in accomplishing the shearing function. The shear plate 31 is provided with an aperture 32 having an inverted, cup-shaped configuration, substantially as shown in FIG. 4, which aperture 32 is normally aligned with the aperture 27 in the feed plate 23 so as to permit passage of the wire 21 therethrough. Shearing of a wire 21 received within the apertures 27 and 32 is accomplished by rotation of one plate relative to the other so as to intentionally misalign the apertures.

To provide for relative rotational movement between the feed plate 23 and the shear plate 31, the feed plate 23 is splined to the inner ram 71 to prevent relative rotational movement thereabout while permitting relative axial movement; whereas, the shear plate 31 receives the inner ram 71 in a central bore 33 (FIG. 4) of such diameter as will permit rotational movement of the shear plate 31 about the splines 74—74. To effect such relative movement between the feed and shear plates 23 and 31, a suitably driven gear 34 (FIGS. 2 and 3) is provided which is engageable in meshing relationship with gear teeth 36 formed around a peripheral portion of the plate 31.

The shearing operation is effected by the intermittent feed apparatus 20 and the shearing mechanism 30 operating in concert and such combination could be utilized by itself for the purpose of feeding and shearing an elongated element to length. For example, the intermittent feed apparatus 20 may be utilized, as above, first to grip and then to advance the elongated element through a prescribed distance, followed by releasing of the element and retraction of the feed mechanism 20. During such advancement and retraction, the shear plate 31 is carried with the feed plate 23; thus, the element may be fed a prescribed distance beyond the contacting surfaces of the plates 23 and 31 of the shear mechanism 30, and the shear plate 31 thereafter rotated relative to the feed plate 23 by the gear drive 34 to shear the element by intentional misalignment of the apertures 32 and 27.

The swaging or flaring assembly 40 (FIGS. 2 and 4) includes a circular forming plate 41 which is coaxial about and splined to the inner ram 71 adjacent the shear plate 31, so as to be precluded from rotational movement relative to the inner ram while being free to move axially therealong. Such relative axial movement results when the inner ram 71 is extended after a plurality of tabs 42—42 around the periphery of the plate 41 engage corresponding stop members 43—43 which limit the advancement of the plate 41 (and thus plates 31 and 23 also). With the plate 41 in this position, a tapered, counterbored aperture 44 forms a swaging cavity wherein the terminus end of the wire 21 may be flared.

The swaging assembly 40 also includes an anvil plate 45 mounted coaxially about the inner ram 71 adjacent the forming plate 41 so as not to be limited in advancement by the stop members 43—43. The anvil plate 45 is engaged with the inner ram 71 for axial movement therewith, as by a flange or ring 46 received in a housing 47, yet is free for rotational movement thereabout. A swaging protrusion or punch 48 is secured to the anvil plate 45 for accommodation in the tapered aperture 44 in the forming plate 41 to swage or flare the terminus end of the wire 21.

To effect such swaging, the anvil plate 45 is movable with the inner ram 71 beyond the stop members 43—43 to separate the anvil plate 45 from the forming plate 41. In addition, the anvil plate 45 is rotatable about the inner ram 71 while spaced apart from the forming plate 41, which rotation may be effected by a suitably driven gear 49 engageable in meshing relationship with gear teeth 49′ formed about a peripheral portion of the anvil plate 45.

In operation, the anvil plate 45 is initially positioned in contact with the forming plate 41—the punch 48 being accommodated within a circumferentially elongated aperture or slot 41a in the plate 41 as shown in FIG. 2. A surface portion of the anvil plate 45 in this position closes off the aligned apertures 27, 32 and 44 so that the terminus end of the wire may be advanced therethrough to abut the anvil plate 45. The anvil plate 45 is then separated from the forming plate 41 to withdraw the punch 48 from the slot 41a, and the drive for the gear 49 is actuated to rotate the anvil plate in a clockwise direction (FIG. 2) to bring the punch 48 into alignment with the swaging cavity 44. The inner ram 71 is thereafter retracted relative to the outer ram 72 to drive the swaging punch 48 into the swaging cavity 44—the outer ram 72 holding the plates 23, 31, and 41 against movement—thereby to flare the terminus end of the wire in accordance with the configuration of the cavity 44.

After the swaging operation, the inner ram 71 again separates the anvil plate 45 from the forming plate 41 to free the punch 48 from the cavity 44 so that the anvil plate 45 may be rotated to bring a bore 45b in the anvil plate 45 into alignment with the swaging cavity 44, the bore 45b being of sufficient diameter to allow passage of the swaged wire-end therethrough. Such rotation also moves the punch 48 into alignment with the far-counter-clockwise end of the slot 41a (shown in phantom lines in FIG. 2) so that it may be accommodated therein upon retraction of the inner ram 71 relative to the outer ram 72 to bring the plates 45 and 41 into contact again. It is to be noted that initially the punch 48 was accommodated in the far-clockwise end of the slot 41a (shown in solid lines) so that the wire could be advanced to abut the upper surface of the anvil plate 45.

In the normal operation of the preferred apparatus, the feeding and swaging steps occur in sequence, and the shearing step does not occur until the wire is attached to the capacitor body. Thus, after the feeding and swaging operations, a return stroke of the compound drive unit 70 is initiated by retracting the outer ram 72 relative to the inner ram 71 to release the wire 21 by permitting the spring 28 to retract the movable jaw 25. Collective movement of the rams 71 and 72 in the return stroke thereafter retracts the entire assemblage of plates (45, 41, 31 and 23) back along the wire 21 to an uppermost position therefor, shown in phantom lines in FIG. 4, as a result of the engagement between the flange 46 and the housing 47. During such retraction, the collar 22 serves to prevent retrograde movement of the wire 21 as the plates slide back therealong—the various apertures being somewhat oversize for such purpose.

Thus, the swaged end of the wire 21 remains in its original position—approximately level with the upper surfaces of the stops 43—43—while the drive 70 retracts the assemblage of plates. During subsequent movement of the compound drive unit 70 in the advancing stroke again, the outer ram 72 is initially extended relative to the inner ram 71, as before, to cam the movable jaw 25 outward again to grip the wire 21 just below the collar 22. The advancing stroke is continued by collective movement of the inner and outer rams to feed the swaged end of the gripped wire toward the solder end-cap 12 of the capacitor body 11, whereupon the unit 50 clamps the swaged end against the solder end-cap.

The clamping or electrode-gripping unit 50 (FIG. 4) includes a generally cylindrical electrode plate 51 mounted on guides 52—52 for movement toward and away from the holding plate 18, the electrode plate 51 being biased away from the holding plate 18 by springs 53—53, as shown in FIG. 4. The electrode plate 51 is provided on the underside thereof with fixed and movable clamping jaws 54 and 55, respectively, which are substantially identical in construction and operation to the gripping jaws 24 and 25 on the feed plate 23.

The movable clamping jaw 55, however, is actuated by a fixed linear cam 56, mounted on the holding plate 18, to grip the swaged end of the wire against the fixed jaw 54. To this end, the linear cam 56 is arranged coaxially of the electrode plate 51 (FIG. 4) so that upon advancement of the electrode plate 51 toward the holding plate 18, a remote beveled end 57 of the movable jaw 55 is engaged by the linear cam 56 to cam it toward the fixed jaw 54, against the bias of a spring 55a, to the clamping position. Such advancement of the electrode plate 51 is effected as the result of engagement thereof by a second flange 58, integral with the lower end of the inner ram 71, near the termination of the advancing stroke of the drive unit 70.

In this manner, the movable clamping jaw 55 is not actuated to grip the swaged end of the wire 21 until the gripped wire has been advanced to a position wherein the swaged end has passed through an aperture 59 in the electrode plate 51 and lies between the clamping jaws 54 and 55. At such time, the inner ram 71 forces the electrode plate 51 against its spring mounting to cam the movable electrode jaw 55 outward until the wire is firmly gripped against the fixed jaw 54 closely adjacent the swaged end. Outward movement of the movable jaw 55 is thereafter terminated by a dwell portion of the cam 56 so that the movable jaw 55 is held in a gripping position while the inner ram 71 continues to force the electrode plate 51 toward the holding plate 18, thereby to advance the swaged end of the wire 21 into firm abutment against the solder end-cap 12 of the capacitor body 11.

It should be noted at this point that the clamping or electrode assembly 50 may be utilized with the feeding mechanism 20 to form a simple combination for clamping and attaching an elongated element to an article. For example, the feeding mechanism 20 could operate in the manner described above to intermittently feed an elongated element a prescribed distance. The clamping or electrode assembly 50 could then cooperate with the feeding mechanism near the end of an advancing stroke, as described above, to effect clamping of the terminus end of the wire against an article. Such apparatus would be advantageous where the elongated element is to be fed and clamped against an article for subsequent attachment thereto. Of course, it may also be desirable to include the shearing mechanism 30 so that an elongated element may be advanced toward and clamped against an article for attachment thereof, and subsequently cut to a prescribed length.

To assist in attaching or fusing the wire 21 as a lead to the capacitor body 11, the flux-applying unit 60 is mounted on the upper surface of the electrode plate 51. The flux unit 60 (FIG. 4) includes a disc 61 mounted on a shaft 62 for rotation by a suitably driven gear 63 engaged with corresponding teeth provided on a peripheral portion of the disc 61. As the swaged end of the wire 21 is advanced toward the capacitor body 11, the advancing stroke is interrupted momentarily when the swaged end of the wire 21 engages the disc 61. At such time, the disc 61—which is coated with a fluxing agent— is rotated by the gear 63 so as to apply flux to the swaged end of the wire, such rotation being terminated when an aperture 64 in the fluxing disc 61 has been aligned with the aperture 59 in the plate 51.

The drive unit 70 is thereafter actuated again to advance the rams 71 and 72 collectively so that the swaged end passes through the apertures 64 and 59 and is clamped by the jaws 54 and 55 against the capacitor body 11.

In the preferred embodiment, the clamping jaws 54 and 55 are formed of graphite so that during the attaching operation a brush contact 66 engages the graphite jaw 54 to complete an electrical circuit through the jaws and the wire. Such electrical circuit is designed to heat the gripped end of the wire 21 to a temperature sufficient to weld the swaged end to the end-cap against which it is held.

With the wire 21 attached to the capacitor body 11, the shearing operation may be commenced. Accordingly the shear plate 31 is rotated by the gear 34 to shear the wire to the desired length and is then returned to its initial position to realign the aperture 32 therein with the apertures in the other plates. Movement of the drive unit 70 in a return stroke is thereafter initiated again by retraction of the outer ram 72 relative to the inner ram 71 to release the movable clamping jaw 25, and subsequent collective retraction of the inner and outer rams 71 and 72 clears the assemblage of plates 45, 41, 31 and 23 from the attached lead. Such collective retraction also permits return of the electrode plate 51 by the springs 53—53 to its initial position, thereby to release the lead from between the electrode jaws 54 and 55.

To facilitate automatic ejection of the finished capacitors, the electrode plate 51 and the fluxing disc 61 are provided with slots 67 and 68 (FIG. 4), respectively, which permit circumferential movement of the leads 13—13 relative to the electrode plate 51 as the holding plate 18 is rotated to clear the leads 13—13 from between electrode jaws 54 and 55. At that point, such slots 67 and 68 communicate radially outward with the periphery of the electrode plate 51 and fluxing disc 61, respectively, to permit automatic disengagement of the lead 13 therefrom upon radially outward ejection.

To provide for effective insertion and ejection of capacitor bodies 11—11, the holding plate 18 is provided with peripheral slots 81—81 (FIG. 2), the capacitor bodies 11–11 being firmly clamped in a spring clip 82 therewithin, substantially as shown. As previously stated, the holding plate 18 is rotated after the welding operation, as for example by a chain drive 83 (FIG. 4), to clear the attached lead from between the graphite clamping jaws 54 and 55. With the plate 18 so rotated, suitable ejection mechanism (not shown) operates merely to push the body 11 radially outward to eject the finished capacitors 10—10, and another suitable mechanism automatically inserts a new capacitor body 11 into the spring clip 82, the plate 18 thereafter being returned to the operating position.

During or after ejection of the finished capacitor, the terminus end of the wire 21 is again brought into abutting relationship against the anvil plate 45, and the assemblage is once more positioned so that the tabs 42—42 on the forming plate 41 engage the stops 43—43. Automatic operation is accomplished by programming the compound drive unit 70 and the auxiliary actuating units 34, 49, 63 and 83 to operate cyclically in performing the entire operation as described above.

One preferred compound drive unit 70 is described herein only by way of example, it being understood that other compound drive units could be employed as well. In the preferred drive unit 70, the outer ram 72 is formed by a thin-walled cylinder which is slidably received within a fixed outer cylinder open at one end. A piston slidably received within the outer ram 72 and fixed to the outer cylinder, permits displacement of the head of the outer ram within the outer cylinder between the head thereof and the piston—suitable port connections for an actuating fluid of course being provided.

The inner ram 71 includes a piston which is preferably received within a separate chamber inside the outer ram 72, such piston being freely displaceable therewithin. Suitable port connections are again provided for an actuating fluid so that displacement of the inner ram 71 may also be controlled. Hence, independent control may be exerted over the inner and outer rams 71 and 72 to effect the requisite collective and relative movements thereof.

Operation

Initially the wire 21 is threaded through the aligned apertures 27, 32, and 44 so that the terminus end thereof abuts the anvil plate 45, as shown in FIG. 5. It will be assumed at the outset that the outer ram 72 has been extended relative to the inner ram 71 to grip the wire 21 between the jaws 24 and 25, and that the overall drive unit 70 has been extended until the forming plate 41 is held against further advancement by engagement of the tabs 42—42 with the stops 43—43.

With the forming plate precluded from further advancement, the inner ram 71 is extended relative to the outer ram 72 to separate the anvil plate 45 from the forming plate 41 (FIG. 6) so as to withdraw the swaging punch 48 from the elongated slot 41a, and the anvil plate 45 is thereafter rotated by the gear 49 (to the right as shown in FIG. 6) to align the swaging punch 48 with the swaging cavity 44. The inner ram 71 is then retracted again relative to the outer ram 72 to force the swaging punch 48 into the swaging cavity 44, thereby to swage or flare the wire end, as is depicted in FIG. 7.

The swaging operation thus having been completed, the anvil plate 45 is again separated from the forming plate 41 by the inner ram 71, and rotated (to the left as shown in FIG. 8) to align the bore 45b with the swaging cavity 44—the swaging punch 48 thereby being aligned with the far left end of the elongated slot 41a—after which the anvil plate is again retracted to engage the forming plate 41. Relative movement between the outer and inner rams 72 and 71 in a return stroke thereafter permits the spring 28 to open the jaws 24 and 25 to release the wire 21, and subsequent collective movement of the rams 71 and 72 in the return stroke retracts the assemblage of plates back along the wire 21 to the position shown in FIG. 9.

The advancing stroke of the drive unit 70 is then commenced by again extending the outer ram 72 relative to the inner ram 71 so as to actuate the jaw 25 to grip the wire again, followed by collective movement of both rams to advance the swaged end of the gripped wire 21 toward the solder end-cap 12 of the capacitor body 11. Such advancement is interrupted momentarily as the swaged end engages the fluxing disc 61 (FIG. 10), at which time the disc 61 is rotated by the gear 63 to apply flux to the swaged end and turn to align the aperture 64 in the disc 61 with the aperture 59 in the electrode plate 51.

As shown in FIG. 11, the advancement of the wire 21 is thereafter continued and the swaged end of the wire passes through the apertures 64 and 59 to a position between the electrode jaws 54 and 55. At such time, the flange 58 on the inner ram 71 engages the electrode plate 51 so as to move the same therewith and actuate the movable jaw 55 to grip the swaged end of the wire and clamp it against the solder end-cap 12. At the same time, the contact brush 66 establishes an electrical circuit through the electrode jaws 54 and 55 to weld the swaged end to the solder end-cap.

The shear plate 31 is thereafter rotated by the gear 34 (to the left as shown in FIG. 12) to shear the attached lead to length and thereby to complete the lead-attaching operation—the position of the stops 43—43 being selected so that the feed plate 23 and the end-cap are spaced apart a distance corresponding to the proper lead length.

The shear plate 31 is subsequently returned to its initial position (FIG. 13) and the gripped wire 21 (not the lead) is retracted slightly by collective movement of the rams 71 and 72 in a return stroke. The clamping jaw 25 is thereafter allowed to release the wire by relative movement between the inner and outer rams 71 and 72, and subsequent collective movement again retracts the entire assemblage of plates back along the wire 21 and clears the attached lead therefrom. Such retraction of the inner ram 71 also permits release of the electrode jaw 55 by the spring 55a as the electrode plate 51 returns to its initial position.

As the assemblage of plates clears the attached lead, the anvil plate 45 is rotated (to the right as shown in FIG. 14) to transfer the swaging punch 48 to the extreme right end of the elongated slot 41a so as once more to present the upper surface of the anvil plate to the swaging cavity 44, and apertures 27 and 32 aligned therewith. At the same time, the holding-plate 18 is rotated to clear the lead from between the electrode jaws 54 and 55, along the slots 67 and 68, so that the finished capacitor may thereafter be ejected and a new capacitor body inserted.

After ejection of the finished capacitor, the fluxing disc 61 is again rotated to its initial position, and the inner ram 71 is retracted to raise the anvil plate 45 into contact with the newly severed end of the wire 21. The outer ram 72 is thereafter extended relative to the inner ram 71 to effect gripping of the wire between the jaws 24 and 25, and both rams 71 and 72 are thereafter collectively extended to force the forming plate tabs 42—42 against the stops 43—43 once again.

While one specific embodiment has been described in detail hereinabove, various modifications may be made without departing from the spirit and scope of the invention, and it is intended that all such modifications be interpreted as encompassed by the invention.

What is claimed is:

1. Apparatus for forming an elongated element from a continuous filament and attaching the element to an article, which comprises:

means for holding the article;
   means for holding a continuous supply of the filament;
   means movable between said filament holding means and said article holding means for advancing the filament into abutting relationship with the article;
   means carried by said advancing means for shaping the terminus extremity of the filament in preparation for attachment to the article and for cutting the filament to length after attachment to the article; and
   means for attaching the shaped end of the filament to the article upon establishment of the abutting relationship therebetween.

2. Apparatus for forming an elongated element from a continuous filament and attaching the element to an article, which comprises:

means for holding the article;
   means for holding a continuous supply of the filament;
   compound carrier means movable between said filament holding means and said article holding means, and including first and second parts selectively actuated to move relative to, and collectively with, each other;
   forming means carried by said carrier means and actuated by initial relative and subsequent collective movement of said first and second parts of said carrier means to grip the filament, to shape the terminus end of the filament and to advance the shaped end into abutting relationship with the article in preparation for attachment thereto, said forming means cutting the filament to length after attachment to the article; and
   means actuated by said compound carrier means upon advancement of the element into abutting relationship with the article for attaching the shaped end of the filament to the article.

3. Apparatus for forming an elongated element from a continuous filament and attaching the element to an article, which comprises:

means for holding the article;
   means for holding a continuous supply of the filament;
   drive means reciprocable between said filament holding means and said article holding means;
   means carried by said drive means for gripping the filament to advance the terminus extremity thereof with said drive means into abutment with the article;

means carried by said drive means to shape the terminus extremity of the filament prior to abutment against the article in preparation for attachment thereto;

means for attaching the shaped end of the filament to the article upon establishment of the abutting relationship therebetween; and means carried by said drive means for cutting the attached filament to length to complete the formation and attachment of an elongated element to the article.

4. Apparatus for forming an elongated element from a continuous metal filament and attaching the element to a metal surface on an article, which comprises:

means for holding the article;

means for holding a continuous supply of the filament;

drive means reciprocable between said filament holding means and said article holding means;

means carried by said drive means for gripping the filament to advance the terminus end thereof with said drive means into abutment with the metal surface of the article;

means carried by said drive means to swage the terminus end of the filament prior to abutment against the article in preparation for attachment thereto;

means for applying flux to the swaged end of the filament prior to abutment against the article;

means for welding the swaged end to the metal surface of the article upon establishment of the abutting relationship therebetween; and means carried by said drive means for cutting the attached filament to length to complete the formation and attachment of an elongated element to the article.

5. Apparatus for forming elongated elements from continuous metal filaments and attaching the elements simultaneously to metal surfaces on opposite sides of an article, which comprises:

means for holding the article;

means for holding a separate continuous supply of the filament in spaced relationship to each of the metal surfaces on opposite sides of the article;

first and second drive means, each reciprocable between one of said filament holding means and said article holding means in synchronism with the other;

means carried by each of said drive means for gripping the filament to advance the terminus end thereof with said drive means into abutment with the corresponding metal surface of the article;

means carried by each of said drive means to swage the terminus end of the filament prior to abutment against the article in preparation for attachment thereto;

means for applying flux to the swaged end of each filament prior to abutment against the corresponding metal surface of the article;

means for welding the swaged end of each filament to the corresponding metal surface of the article upon establishment of the abutting relationship therebetween; and means carried by each of said drive means for cutting the attached filament to length to complete the formation and attachment of elongated elements to opposite sides of the article.

6. Apparatus for forming and attaching leads to electrical components having solder end-caps, which comprises:

means for holding the component;

means for holding a continuous supply of lead wire;

reciprocable compound carrier means operative between said wire holding means and component holding means, and including first and second parts selectively actuated to move relative to, and collectively with, each other;

forming means carried by said carrier means and including a gripping portion, a swaging portion, and a shearing portion;

said gripping portion being actuated to grip the lead wire upon initial relative movement between said first and second parts, and continuing in an actuated condition during subsequent collective movement thereof, in an advancing stroke of said compound carrier means toward the component;

said swaging portion being actuated to swage the terminus end of the first upon relative movement between said first and second parts in the advancing stroke of said compound carrier;

electrode means actuatable by said compound carrier means in the advancing stroke as the swaged end abuts against the solder end-cap of the component, to grip the swaged end thereagainst so that an electrical circuit may be completed therethrough to fuse the solder end-cap and swaged end together;

said gripping portion of said forming means being deactuated to release the lead wire upon relative movement of said first and second parts prior to collective movement thereof in a return stroke of said compound carrier means; and said shearing portion of said forming means being actuated to shear the wire after a prescribed collective movement of said first and second parts in a return stroke of said compound carrier means away from the component.

7. The apparatus as recited in claim 6, wherein the forming means comprise:

a plurality of plates mounted in stacked relationship on the first part of the compound carrier means;

a first and outermost one of said plates having an aperture through which the wire may be slidably received longitudinally of itself;

gripping means mounted on an outermost surface of said first plate and actuatable to grip the wire by relative movement between the first and second parts of the compound carrier means;

a second one of said plates, adjacent said first plate, having an aperture therethrough normally aligned with the aperture in said first plate to permit reception of the wire therethrough, said second plate being actuatable to move relative to said first plate laterally of the wire to shear the wire by intentional misalignment of the apertures therein;

means for actuating said second plate to shear the wire after a prescribed retraction of said plates by said compound carrier means in the return stroke;

a third one of said plates, adjacent said second plate, having a swaging cavity communicating with the aperture in said second plate, when in its normal position, to permit reception of the terminus end of the wire therein;

a fourth one of said plates, adjacent said third plate, having a swaging projection movable into and out of the swaging cavity in said third plate to swage the terminus end of the wire, and having an aperture normally misaligned with the swaging cavity, said fourth plate being movable relative to said third plate laterally of the wire to align the aperture therein with the swaging cavity so that the wire may be slidably received therethrough after the swaging operation;

means actuatable by relative movement between said first and second parts of said compound carrier means to cause the swaging projection to enter and recede from the swaging cavity to swage the terminus end of the wire; and means for causing relative movement between said fourth and third plates to align the aperture in said fourth plate with the swaging cavity.

8. Apparatus for intermittently feeding an elongated element, attaching a terminus end thereof to an article, and cutting the attached portion to length, which comprises:

means for holding the article;

first means responsive to camming action to grip portions of the element remote from the terminus end, said first gripping means being movable with the gripped element toward and away from the article;

reciprocable means including first and second parts;

said first part being engaged with said first gripping means and holding the same against movement relative thereto toward and away from the article;

said second part having a camming surface engageable with said first gripping means and being actuated to move relative to said first part upon initial movement of said reciprocable means in an advancing stroke, to actuate said first gripping means to grip the element;

said first and second parts being actuated to move collectively toward the article upon continued movement of said reciprocable means in the advancing stroke, to advance said first gripping means with the gripped element into abutting relationship with the article;

second means responsive to camming movement to grip the terminus end of the element in close proximity to the article, said second gripping means being movable toward and away from the article;

said first part of said reciprocable means being engageable with said second gripping means to move it toward the article when the terminus end of the element has been advanced to a position closely adjacent the article;

fixed camming means for actuating said second gripping means, upon initial movement thereof by said first part of said reciprocable means, to grip the terminus end of the element, said fixed camming means being arranged to hold said second gripping means in an actuated state so that the terminus end of the element may be advanced to abut the article upon continued movement of said second gripping means by said first part;

means for attaching the terminus end of the element to the article;

means for biasing said second gripping means away from the article to the initial position thereof;

said second part of said reciprocable means being actuated to move relative to said first part upon initial movement of said reciprocable means in a return stroke, to deactuate said first gripping means;

said first and second parts being actuated to move collectively away from the article upon continued movement of said reciprocable means in the return stroke, to return said first gripping means to the initial position thereof and to permit said second gripping means to be returned by said biasing means to the initial position thereof and to release the element;

means carried by said first gripping means and actuatable to shear the element; and means for actuating said shearing means upon the return stroke of said reciprocable means after the shearing means have been retracted a prescribed distance back along the element.

9. Apparatus for simultaneously forming and attaching leads to opposite ends of an electrical component having solder end-caps, which comprises:

means for holding the component;

means for holding a separate continuous supply of wire in spaced relationship to each end of the component, said wire holding means resisting reverse movement of the wire back into the supply;

a pair of feed members, one associated with each wire holding means and having an aperture through which the wire may be slidably received longitudinally of itself, said feed members being movable between the associated wire holding means and the corresponding end of the component;

a pair of first gripping jaws carried by each of said feed members and actuatable by camming action to grip the wire received in the aperture;

separate drive means associated with each wire holding means and reciprocable in synchronism between the same and the corresponding end of the component, each of said drive means including first and second parts;

said first part of each drive means being engaged with the corresponding feed member and holding said feed member against movement relative thereto toward and away from the component;

said second part of each drive means having a camming surface engageable with the corresponding first gripping jaws and being actuated to move relative to said first part upon initial movement of said drive means in an advancing stroke toward the component, to actuate said jaws to grip the wire;

said first and second parts of each drive means being actuated to move collectively toward the component upon continued movement of said drive means in the advancing stroke, to advance the corresponding feed member with the gripped wire a prescribed distance;

a pair of movable carrier members;

means for resiliently mounting each of said carrier members on said component holding means adjacent opposite associated ends of the component;

a pair of electrode jaws carried by each carrier member and actuatable by camming action to grip the wire;

said first part of each drive means being engageable with the corresponding movable carrier member when the terminus end of the wire has been advanced to a position between said electrode jaws, to move said carrier member against the bias of said resilient mounting means toward the component;

fixed camming means associated with each carrier member for actuating said electrode jaws thereon to grip the terminus end of the wire therebetween upon initial movement of said carrier member toward the component by said first part of the corresponding drive means, said fixed camming means being arranged to hold said electrode jaws in an actuated condition upon continued movement of said carrier member toward the component by said first part so that the terminus end of the gripped wire is held firmly against the corresponding solder end-cap of the component;

means for establishing electrical connection to each pair of said electrode jaws so that an electrical circuit may be completed thereto to heat the corresponding wire-end and solder end-cap to fuse the two together;

said second part of each drive means being actuated to move relative to said first part upon initial movement of said drive means in a return stroke, to permit the corresponding first gripping jaws to release the wire;

said first and second parts of each drive means being actuated to move collectively away from the component upon continued movement in the return stroke, to return the corresponding feed member along the wire to the initial position thereof and to permit the corresponding carrier member to be returned to the initial position thereof by the associated resilient mounting means and thereby to permit said electrode jaws thereon to release the wire;

a pair of shearing members, one movable with each of said feed members and having an aperture normally aligned with the aperture in said feed member to permit the wire to be slidably received therethrough, opposed surfaces surrounding the apertures in said shearing member and said feed member being in contacting relationship; and means for causing relative movement between each shearing member and the associated feed member laterally of the wire after the opposed contacting surfaces thereof have been retracted a prescribed distance back along the wire upon retraction of said feed member by the corresponding drive means, to shear the wire by intentional misalignment of the apertures therein.

10. The apparatus as recited in claim 9, wherein:
means are provided for swaging the terminus end of each wire prior to attachment thereof to the corresponding end of the component, said swaging means being movable with the associated feed and shearing members.

11. The apparatus as recited in claim 9, wherein:
a pair of swaging members are provided for each wire and are movable with the associated feed and shearing members;
a first one of said swaging members in each pair defining a swaging cavity communicating with the apertures in the associated feed and shearing members to permit the wire to be slidably received therethrough;
a second one of said swaging members in each pair having a swaging punch actuatable to move into and out of the swaging cavity in the corresponding first swaging member, said second swaging member also being actuatable to move laterally of said first swaging member and having an aperture therethrough so that upon completion of the swaging operation, the aperture therein may be aligned with the swaging cavity and the wire may be slidably received therethrough in preparation for the welding operation;
means are provided for actuating each second swaging member after the terminus end of the associated wire has been received in the corresponding swaging cavity and while the wire is gripped by the first gripping jaws, to force said swaging punch into and out of the swaging cavity to swage the terminus end of the wire; and
means are provided for actuating each second swaging member to move relative to and laterally of said associated first swaging member to align the aperture therein with the swaging cavity.

12. Apparatus for intermittently feeding an elongated element, which comprises:
a movable feed member;
a pair of gripping jaws carried by said feed member and actuatable by camming action to grip an element received therebetween;
reciprocable means including first and second parts;
said first part being engaged with said feed member and holding said feed member against movement relative thereto longitudinally of the element;
said second part having a camming surface engageable with said gripping jaws and being actuated to move relative to said first part upon initial movement of said reciprocable means in an advancing stroke, to actuate said jaws to grip the element;
said first and second parts being actuated to move collectively, longitudinally of the element upon continued movement of said reciprocable means in the advancing stroke, to advance the gripped element a prescribed distance;
said second part being actuated to move relative to said first part upon initial movement of said reciprocable means in a return stroke, to deactuate said gripping jaws and to release the element; and
said first and second parts being actuated to move collectively back along the element upon continued movement of said reciprocable means in the return stroke, to return said feed member to the initial position thereof;
whereby the element may be intermittently fed longitudinally of itself upon continuous reciprocal movement of said reciprocable means.

13. Apparatus for intermittently advancing a filament, which comprises:
means for holding a continuous supply of filament which is freely dispensible, said holding means resisting reverse movement of the filament back into the supply;
a feed member having an aperture through which the filament may be slidably received longitudinally of itself, said feed member being movable toward and away from said filament holding means;
a pair of gripping jaws carried by said feed member and actuatable by camming action to grip the filament received in the aperture;
reciprocable means including first and second parts;
said first part being engaged with said feed member and holding said feed member against movement relative thereto toward and away from said filament holding means;
said second part having a camming surface engageable with said gripping jaws and being actuated to move relative to said first part upon initial movement of said reciprocable means in an advancing stroke, to actuate said jaws to grip the filament;
said first and second parts being actuated to move collectively away from said filament holding means upon continued movement of said reciprocable means in the advancing stroke, to advance said feed member with the gripped filament a prescribed distance;
said second part being actuated to move relative to said first part upon initial movement of said reciprocable means in a return stroke, to deactuate said gripping jaws and release the filament; and
said first and second parts being actuated to move collectively toward said filament holding means upon continued movement of said reciprocable means in the return stroke, to return said feed member back along the filament to the initial position thereof;
whereby the filament may be intermittently fed longitudinally of itself upon continuous reciprocal movement of said reciprocable means.

14. The apparatus as recited in claim 13, wherein the gripping jaws comprise:
a first gripping jaw fixed to the feed member at one side of the aperture with the gripping surface projecting at least to the corresponding edge of the aperture;
a second gripping jaw movably carried by the feed member in opposed, spaced relation to said first gripping jaw, said second jaw being engageable by the camming surface of the second part of the reciprocable means to move toward said first jaw to grip the filament therebetween; and
means for biasing said second jaw to an open position so that the filament is released upon initial movement of the second part in the return stroke of the reciprocable means.

15. Apparatus for intermittently feeding an elongated element and for cutting the element into prescribed lengths, which comprises:
a movable feed member;
means carried by said feed member and actuatable by camming action to grip the element;
reciprocable means including first and second parts;
said first part being engaged with said feed member and holding said feed member against movement relative thereto longitudinally of the element;
said second part having a camming surface engageable with said gripping means and being actuated to move relative to said first part upon initial movement of said reciprocable means in an advancing stroke, to actuate said jaws to grip the element;

said first and second parts being actuated to move collectively, longitudinally of the element upon continued movement of said reciprocable means in the advancing stroke, to advance the gripped element a prescribed distance;

said second part being actuated to move relative to said first part upon initial movement of said reciprocable means in a return stroke, to deactuate said gripping means and release the element;

said first and second parts being actuated to move collectively back along the element upon continued movement of said reciprocable means in the return stroke, to return said feed member to the initial position thereof;

means movable with said feed member and actuatable to shear the element; and means for actuating said shearing means after said shearing means have been retracted a prescribed distance back along the element by said reciprocable means to cut the element to the desired length;

whereby the element may be intermittently fed longitudinally of itself and cut into prescribed lengths upon continuous reciprocal movement of said reciprocable means.

16. Apparatus for intermittently advancing a filament and cutting the filament into prescribed lengths, which comprises:

means for holding a continuous supply of filament which is freely dispensible, said holding means resisting reverse movement of the filament back into the supply;

a feed member having an aperture through which the filament may be slidably received longitudinally of itself, said feed member being movable toward and away from said filament holding means;

a pair of gripping jaws carried by said feed member and actuatable by camming action to grip the filament received in the aperture;

reciprocable means including first and second parts;

said first part being engaged with said feed member and holding said feed member against movement relative thereto toward and away from said filament holding means;

said second part having a camming surface engageable with said gripping jaws and being actuated to move relative to said first part upon initial movement of said reciprocable means in an advancing stroke, to actuate said jaws to grip the filament;

said first and second parts being actuated to move away from said filament holding means upon continued movement of said reciprocable means in the advancing stroke, to advance said feed member with the gripped filament a prescribed distance;

said second part being actuated to move relative to said first part upon initial movement of said reciprocable means in a return stroke, to deactuate said gripping jaws and release the filament;

said first and second parts being actuated to move collectively toward said filament holding means upon continued movement of said reciprocable means in the return stroke, to return said feed member back along the filament to the initial position thereof;

a shearing member movable with said feed member and having an aperture normally aligned with the aperture in said feed member to permit the filament to be slidably received therethrough, opposed surfaces surrounding the apertures in said shearing member and said feed member being in contacting relationship;

said feed member and said shearing member being actuatable to move relative to one another laterally of the filament; and means for causing relative movement between said feed member and said shearing member laterally of the filament after said shearing member has been retracted a prescribed distance back along the filament by said reciprocable means, to shear the filament to length by intentional misalignment of the apertures therein;

whereby the filament may be intermittently fed longitudinally of itself and cut into prescribed lengths upon continuous reciprocal movement of said reciprocable means.

17. Apparatus for advancing and clamping an element to an article for an attaching operation, which comprises:

means for holding the article;

a movable feed member;

first means carried by said feed member and actuatable by camming action to grip the element;

movable means including first and second parts;

said first part being engaged with said feed member and holding said feed member against movement relative thereto toward and away from the element;

said second part having a camming surface engageable with said first gripping means and being actuated to move relative to said first part upon initial movement of said movable means toward the article in an advancing stroke to actuate said first gripping means to grip the element;

said first and second parts being actuated to move collectively toward the article upon continued movement of said movable means in the advancing stroke, to advance the element into abutting relationship with the article;

second means responsive to camming action to grip the element in close proximity to the article, and movable toward and away from the article; and camming means for actuating said second gripping means to grip the element;

said first part of said movable means being engageable with said second gripping means to move relative to said camming means and toward said article holding means as the element nears the article to actuate said second gripping means to grip the element and clamp it firmly against the article.

18. The apparatus as recited in claim 17, wherein:

the second camming means are stationary; and the second gripping means comprises:

a movable carrier member engageable by the first part of the movable means for movement toward the article; and a pair of electrode jaws carried by said carrier member and actuatable by the camming means to grip the element as it nears the article upon initial movement of said carrier member toward the article and to clamp the gripped element against the article upon continued movement of said carrier member.

19. Apparatus for swaging the terminus end of a filament, which comprises:

a first member defining a swaging cavity open at both ends;

a second member having a swaging punch, said first member having an elongated slot in a surface adjacent the cavity for normally accommodating the punch at one end thereof so that a surface of said second member opposite the cavity serves as a stop for the terminus end of a filament received in the cavity;

means for holding the filament in fixed relationship to said first member;

reciprocable means for moving said first and second members apart to withdraw the punch from the accommodating slot; and means for moving one of said members laterally of the other to align the punch with the cavity;

said reciprocable means then moving said members relatively together and apart again to swage the terminus end of the filament in the cavity with the punch;

said lateral moving means moving one of said members laterally of the other again to align the punch with an opposite end of the elongated slot;

said reciprocable means thereafter moving said members relatively together again;

said second member having a bore therethrough which is aligned with the cavity in said first member when the punch is accommodated within the opposite end of the elongated slot so that the swaged end of the wire may be extracted from the swaging cavity through the bore.

20. Apparatus for preparing the terminus extremity of a filament for attachment to an article and for cutting the filament to length, which comprises:

means for holding a continuous supply of the filament;

reciprocabe drive means operative to move toward and away from said filament holding means;

means carried by said drive means for gripping the filament for movement therewith in an advancing stroke of said drive means away from said filament holding means, said gripping means releasing the filament on the return stroke of said drive means;

means carried by said drive means for shaping the terminus extremity of the filament during advancement thereof in preparation for attachment to the article; and means carried by said drive means for shearing the filament to length after said shearing means has been retracted a prescribed distance back along the filament during the return stroke of said drive means.

21. Apparatus for attaching an element to an article, which comprises:

means for holding the article;

a carrier member;

reciprocally operated moving means engageable with said carrier member for imparting movement of said carrier member toward the article;

a pair of electrode jaws carried by said carrier member and actuatable in response to camming action to grip an element received therebetween;

camming means for actuating said electrode jaws to grip the element upon initial movement of said carrier member by said moving means, said camming means being arranged to hold said electrode jaws in an actuated state so that the gripped element advances to abut the article upon continued movement by said moving means;

means for biasing said electrode jaws to an open position when said jaws are permitted to release the element;

means for biasing said carrier member back to its initial position upon retraction of the moving means, and fusing means comprising means for applying an electrical potential to said electrode jaws to effect fusion of the element and article at the junction thereof.

References Cited

UNITED STATES PATENTS

| | | | |
|---|---|---|---|
| 1,525,626 | 2/1925 | Taylor | 219—161 X |
| 2,696,546 | 12/1954 | Dubilier | 218—5 X |
| 2,836,287 | 5/1958 | Cady | 226—162 |
| 2,928,931 | 3/1960 | Hoopes et al. | 219—85 |
| 3,059,321 | 10/1962 | Pityo | 29—155.5 |

RICHARD M. WOOD, *Primary Examiner.*

B. A. STEIN, *Assistant Examiner.*